No. 790,153. PATENTED MAY 16, 1905.
T. PULMAN.
BARREL VENTILATOR AND COOLER.
APPLICATION FILED MAR. 26, 1903.
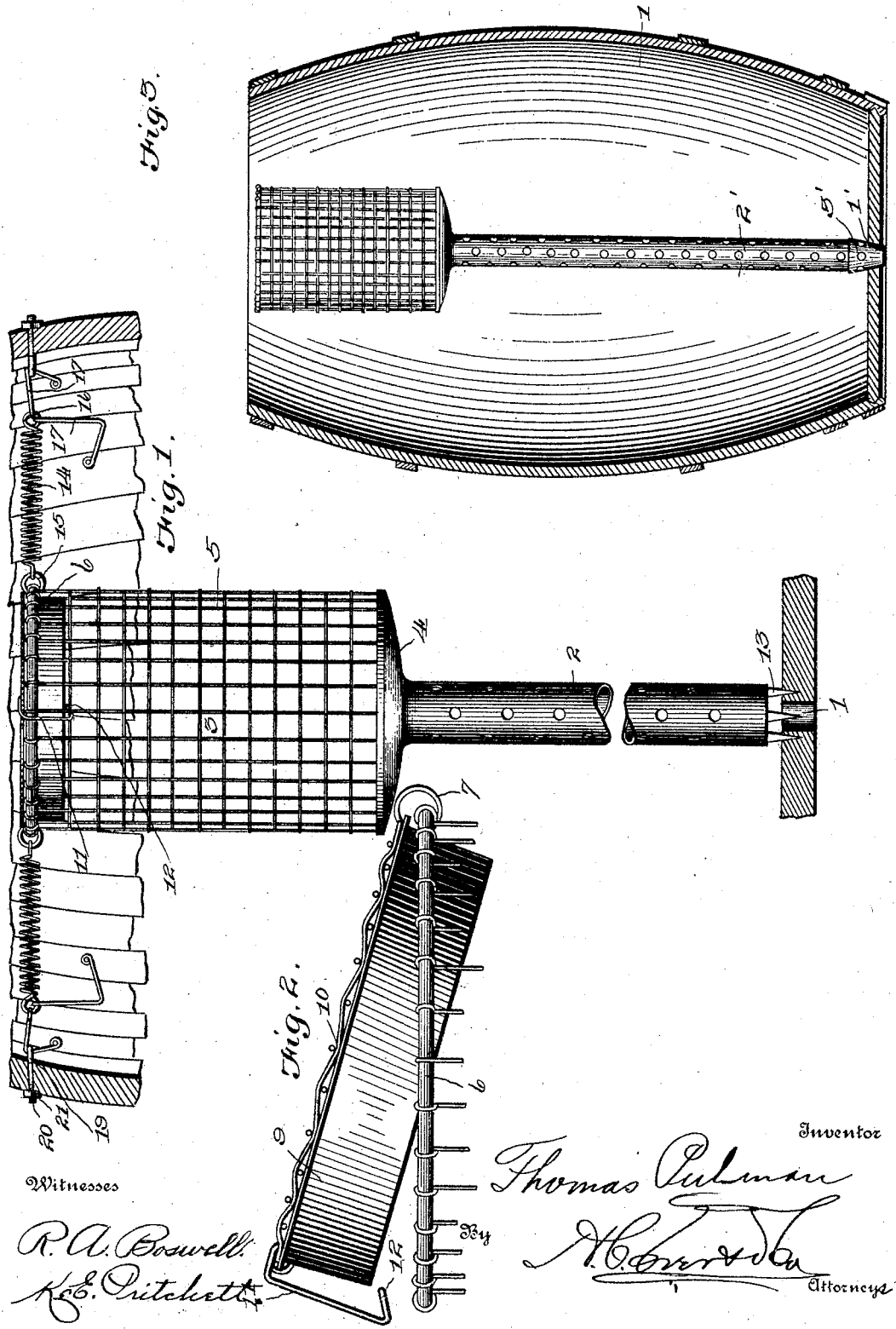

No. 790,153.                                      Patented May 16, 1905.

UNITED STATES PATENT OFFICE.

THOMAS PULMAN, OF CAMERON RUN, VIRGINIA.

BARREL VENTILATOR AND COOLER.

SPECIFICATION forming part of Letters Patent No. 790,153, dated May 16, 1905.

Application filed March 26, 1903. Serial No. 149,718.

*To all whom it may concern:*

Be it known that I, THOMAS PULMAN, a citizen of the United States of America, residing at Cameron Run, in the county of Fairfax and State of Virginia, have invented certain new and useful Improvements in Barrel Ventilators and Coolers, of which the following is a specification, reference being had therein to the accompanying drawings.

My invention relates to certain new and useful improvements in barrel ventilators and coolers, and has for its object a device of this type which may be readily positioned and removed from the barrel, about which the vegetables or other matter contained in the barrel may be conveniently packed, and which will permit of a free and continuous circulation of air through the barrel which will prevent decomposition of the vegetable or fruit which often results from radiation of the heat within the vegetables or fruits.

Vegetables and fruits immediately after being plucked or gathered are placed within barrels or other receptacles and naturally contain a certain amount of heat which will radiate after the vegetables or fruit have been placed within the barrel. This radiation of the heat is most dangerous within the central portion of the barrel, at which point air is practically excluded, and consequently decay and decomposition of the fruit or vegetable is invariably caused by this radiation of the heat at this point. By my invention I obviate this objection and further provide for the reception of any desired cooling agent, which, acting in conjunction with the free and continued circulation of air through the central portion of the barrel, effectually cools the air surrounding the vegetables or fruit, and thereby serves to retain the same in a cool and fresh condition.

Further advantages will be set forth in the following specification and defined in the appended claim.

In the accompanying drawings, in which like numerals of reference indicate like parts throughout the several views, Figure 1 is a side elevation of my improvement, showing the upper and lower portion of the barrel in section and broken away. Fig. 2 is a detail view of the upper portion of the receptacle and a cover therefor, and Fig. 3 is a modification showing a vertical sectional view of the barrel with the ventilator and cooler in position therein.

Referring to the accompanying drawings, 1 indicates a barrel, in the bottom of which is provided an opening 1' of slight diameter for the purpose of admitting air into a foraminous tube 2, which extends the greater length of the barrel and at its upper end carries a receptacle 3 of greater diameter than the tube and which is preferably formed with a bottom 4, suitably secured to the foraminous tube 2, this bottom being inclined downwardly toward the tube for a purpose shortly to be referred to. The sides of the receptacle are preferably formed of a foraminous material, and I have illustrated the same as being formed of wire mesh 5, which is suitably secured to the outer edge of the bottom 4. At the upper portion of the wire mesh is secured a ring 6, which is suitably secured to the longitudinal strands of wire mesh in any approved fashion. Hinged, as at 7, to the wire ring 6 is a cover formed of an annular portion 9, a wire mesh 10 being suitably secured to the upper face thereof. In order to secure the cover in its closed position, I provide the same with a hook 11, the end 12 of which is adapted to engage the uppermost transverse strand of the wire mesh 5, though it will be obvious that any other form of fastening means may be employed, since it is purely optional and does not affect the operation of the invention. Circumferentially secured about the lower end of the tube is a series of spurs 13, which are adapted to engage in the bottom of the barrel, around the aperture 1 thereof, and thereby prevent movement of the lower end of the tube. The means for retaining the device at its upper end consists of spiral springs 14, secured at diametrically opposite points on the wire ring 6 through the medium of small eyes 15, which are engaged by one end of the spiral spring 14, the opposite end thereof being suitably formed with an eye 16, which receives the ends of the series of hooks 17, which are of varying lengths in order to accommodate the device to barrels of varying diameters, though causing no great amount of strain upon the spiral springs 14, which would be the case were it necessary to expand the same to an unusual degree. By this simple arrangement the device may be readily used in barrels of varying diameters, since it will be obvious that only one of the hooks of each spring is employed at the same time. These hooks engage in eyes 19, secured at diametrically opposite points in the barrel in any convenient manner. In this instance I have shown the eyes as being formed upon the ends of threaded bolts 20, the latter receiving a nut 21, which secures it in its stationary position, though it will readily be perceived that this is not essential, and various equivalents therefor might be employed.

In the modification I have illustrated a foraminous tube 2', which at its lower portion carries a tapering socket 3', the latter being received within an opening 1', formed in the bottom of the barrel, in lieu of the spurs which are employed in the preferred form. In other respects this modification is practically similar to the preferred form, with the exception that I do not provide a cover or top, but form the ventilator of such length as will permit the upper end of the same to lie substantially flush with or slightly above the upper end of the barrel.

By placing within the receptacle any cooling agency, such as crushed ice, it will be perceived that the drippings of the latter will be readily conducted, by reason of the tapering bottom of the receptacle, to the tube 2, and the lower end of the latter being in alinement with the opening in the bottom of the barrel the drippings will readily egress. Cooled air being of greater specific gravity than the normal atmosphere will gravitate downwardly and egress through the various openings in the foraminous tube, and the latter being positioned centrally in the barrel the contents thereof will be completely cooled. It is not essential that a cooling agency be employed, since the upper and lower ends of the ventilator being in communication with the outer atmosphere a continual circulation of air will take place through the tube and cool the contents about the ventilator.

The above, as will be noted, is necessarily in detail in order to set forth the complete disclosure of my invention, though it will be obvious that the details need not be strictly adhered to, since various alterations and changes may be readily resorted to without departing from the spirit and scope of my invention.

Having thus fully described my invention, what I claim as new, and desire to secure by Letters Patent, is—

A ventilating device, comprising the combination of a barrel having a perforated tube therein, open at top and bottom, a series of eyes secured to the inside of the barrel, a receptacle secured on top of said tube and having a concave bottom into which the tube opens at its upper end, springs attached to the upper edge of said receptacle and hooks attached to said springs and adapted to engage the eyes on the inside of the barrel, substantially as described.

In testimony whereof I affix my signature in the presence of two witnesses.

THOMAS PULMAN.

Witnesses:
  A. J. SCHWARZ,
  W. G. DAVIS.